Jan. 5, 1943.  O. W. BECKER  2,307,614
PROCESS AND APPARATUS FOR DRYING AND CONVEYING TUBULAR PRODUCTS
Filed March 22, 1939  3 Sheets-Sheet 1
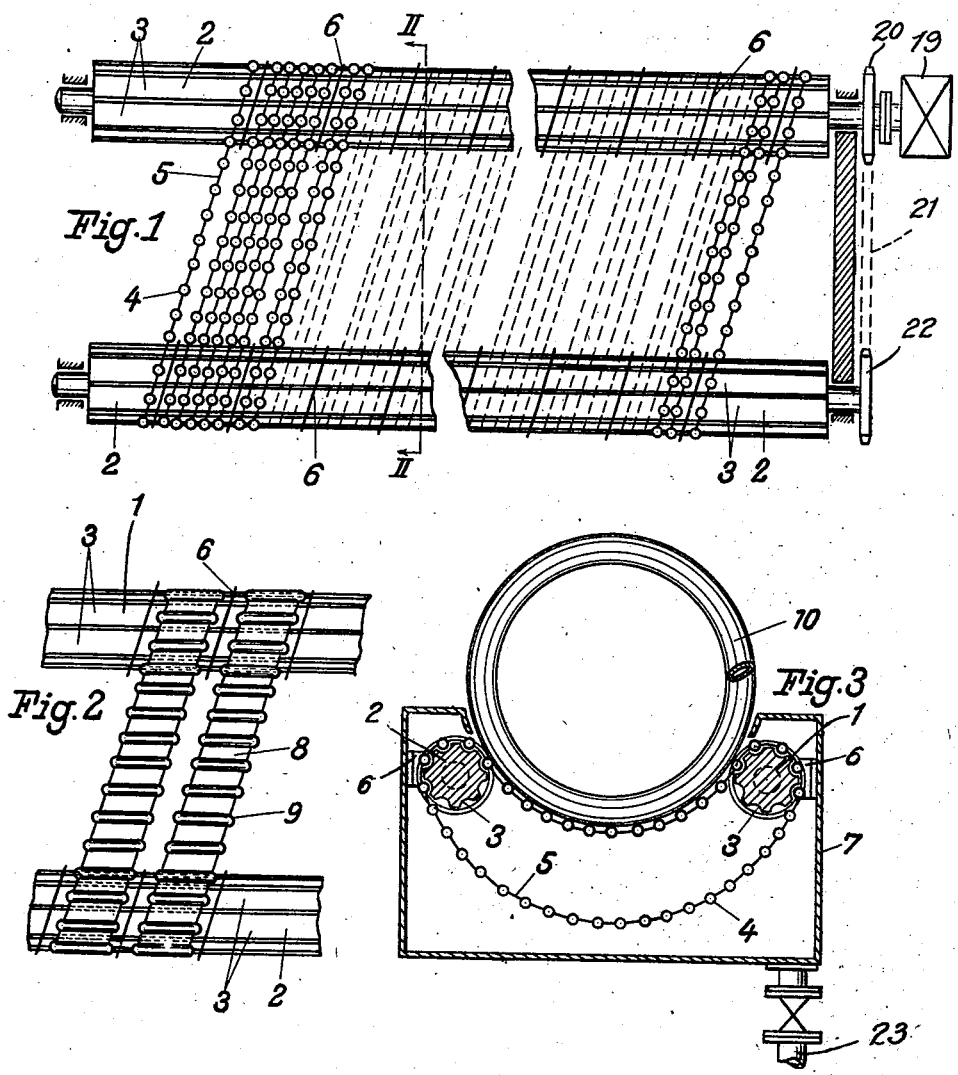
Inventor:
O. W. Becker

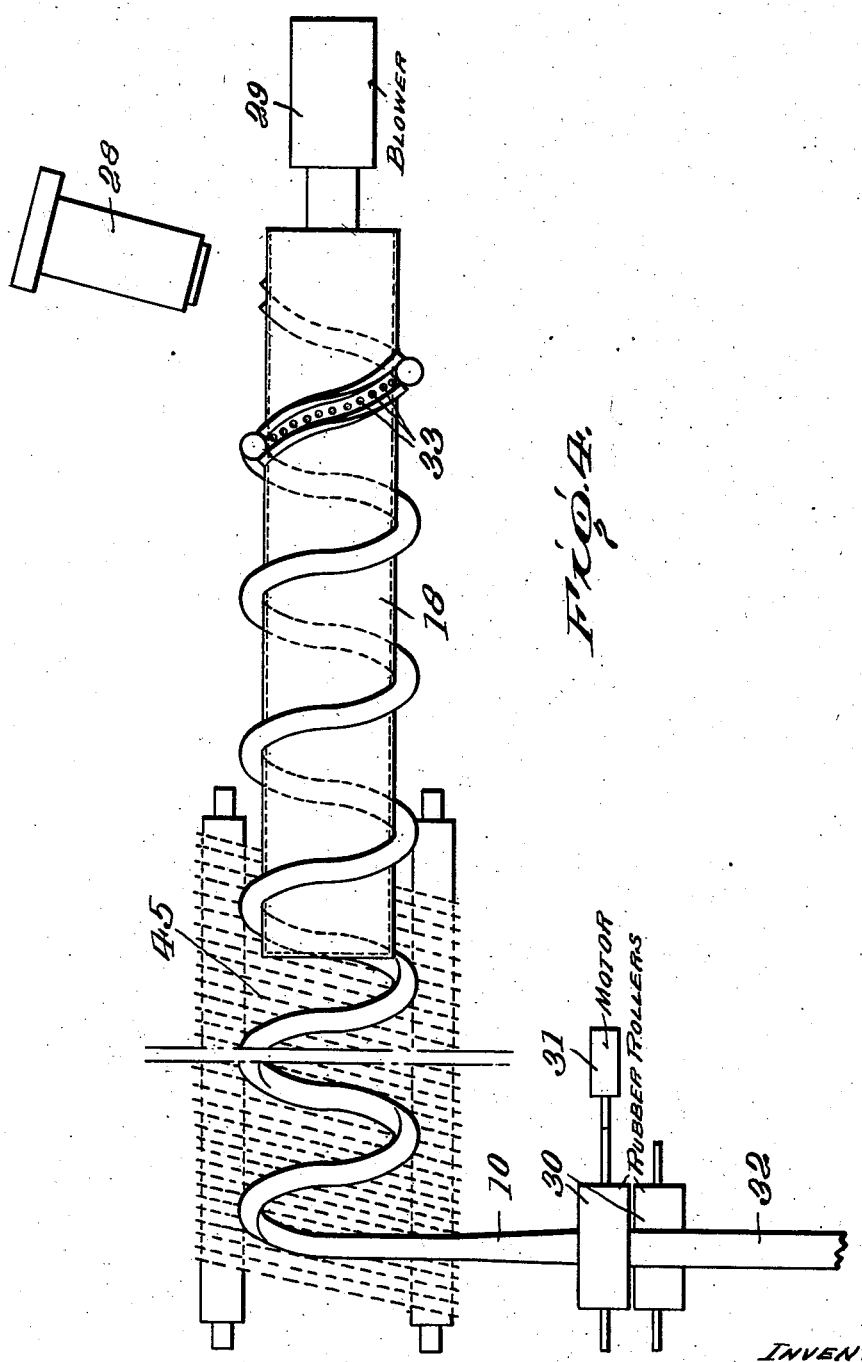

Jan. 5, 1943.  O. W. BECKER  2,307,614
PROCESS AND APPARATUS FOR DRYING AND CONVEYING TUBULAR PRODUCTS
Filed March 22, 1939   3 Sheets-Sheet 3
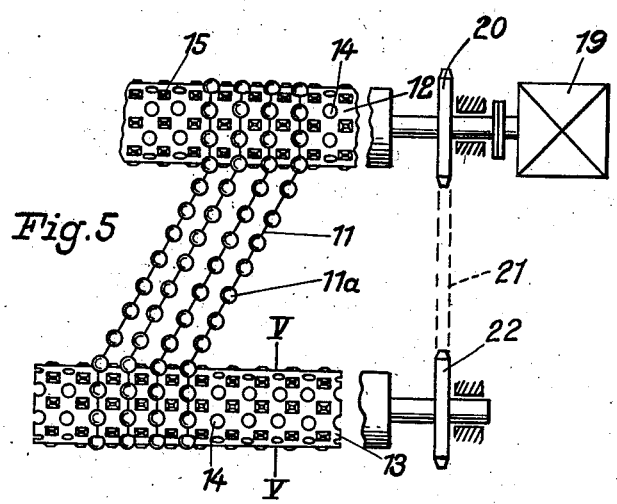
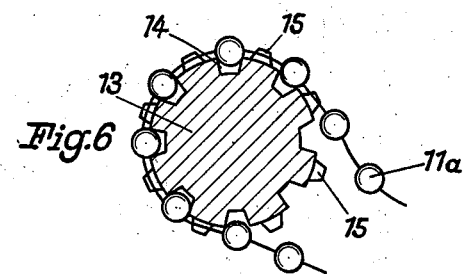
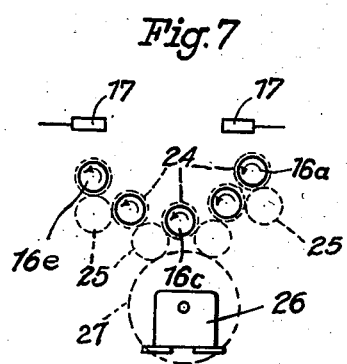
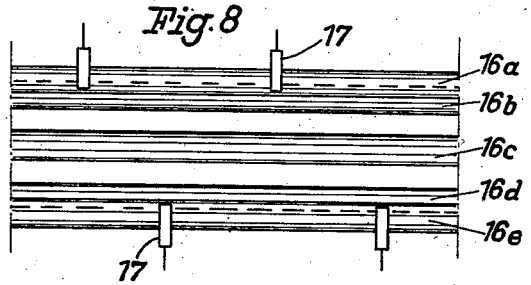

Patented Jan. 5, 1943

2,307,614

UNITED STATES PATENT OFFICE 2,307,614

PROCESS AND APPARATUS FOR DRYING AND CONVEYING TUBULAR PRODUCTS

Oskar Walter Becker, Heidelberg, Germany; vested in the Alien Property Custodian Application March 22, 1939, Serial No. 263,554
In Germany April 12, 1938

15 Claims. (Cl. 18—57)

This invention relates to a process and apparatus for drying and conveying tubular products, especially artificial sausage skins.

It is known to produce tubular products, which can be employed for example as artificial sausage skins, from solutions or fibre masses of vegetable or animal origin and thereafter to dry them, whereby the tubes blown up with gas are led through drying shafts in which they are bathed from all sides with hot air or another hot gas.

It has already been proposed in the continuous production of tubes, in order to avoid the conveying of the tube over conveyor bands and numerous freely movable carrying rollers which takes place upon drying, to dry and to convey the tubular products in that the material to be dried is kept floating and is advanced by a hot gas stream. For this purpose the tube blown up with gas, which is produced for example by extrusion from an annular nozzle is led over a channel from which a hot gas flows out towards the tube through narrow escape openings. Hence the tube floats to a certain degree upon the gas stream. The tubular product is thereby conveyed along the drying path without any resistance worth mentioning. The friction is very small, which is of great advantage with the mechanical sensitive structure of an artificial tube which is to be dried.

In the production of straight tubular skins the gas escape openings of the channel supplying the drying gas upon which the tubular products come to lie, are disposed in a straight line. When coronary sausage skins are to be produced, a tubular channel is preferably employed for the supply of drying gas, the diameter of which channel corresponds to that of the ring or corona to be produced. In this case the gas escape openings are arranged spirally in the wall of the channel and the tubular product is advanced spirally about the tube and is thereby always disposed above the gas escape openings.

The present invention has as its object a further improvement of the drying and conveying of tubular products, which are led spirally by way of example for the production of coronary casings (Kranzdärme).

It has been found that it is not necessary to lead the tubular product spirally about a tube for drying, but that the material to be dried may also be advanced in the hot gas stream, for example the air stream, in continuous spiral form, standing freely by itself, that is to say supported from below only.

For this purpose the tubular product blown up with gas is led over a trough suited to the spiral curvature, the trough surface of which moves in the direction of rotation of the spiral.

It has been shown that the tubular product need only be supported upon a small part of the periphery of the spiral and that the spiral remains wholly in the mould with its remaining parts and does not require special holding. The individual turns of the spiral remain at a distance from one another during the advancement of the entire spiral so that the tubular product can be well washed from all sides by the gas stream.

The advantage of such a leading and conveying of the tubular product consists essentially in that the points of contact of the spiral with the rigid base are reduced to a very small amount. The friction is considerably reduced, whereby the velocity with which the tubular product is led off can be considerably increased. Since the drying gas stream has ready access to all parts of the spiral the drying takes place more quickly, which on the one hand makes possible an increased production, or whereby on the other hand the drying path can be considerably shortened.

In carrying out the process according to the invention there is provided following the annular nozzle, from which the tubular product is extruded, a trough, the trough surface of which moves in the direction of rotation of the spiral and which has gas escape openings for the drying gas. The tubular products emerging from the nozzle and blown up with gas are disposed in spiral form in such a way that the lower part of the tubular spiral comes to lie upon the trough surface. Because of the continuous movement of this trough surface in the direction of rotation of the spiral, the whole spiral rotates upon the trough, so that the spiral is conveyed correspondingly, whereby fresh parts of the continuous spiral continually come into the trough surface, move on for a little with this moving surface and thereafter emerge from the trough.

The trough surface may itself be constructed as desired; it may represent a continuous surface with gas escape openings, for example a band or the like. Preferably the trough surface is constructed of link-chains arranged beside one another, which are provided in an inclined position and which are adapted by their inclined position to the pitch of the spiral. Preferably the link-chains are made endless and allowed to run upon driving discs. The upper part of the chain hanging down between the driving discs then forms the trough for the continuous spiral. The form of the trough can readily be made regulable, in that the length of chain hanging down is enlarged or diminished, to produce a deeper or flatter trough. For this reason the endless link-chain is made of a length far exceeding double the distance between the driving discs in order to extend the limits of variability of the depth of the trough as far as possible. The lower part of the link-chain hangs down more or less far according to the adjustment of trough depth.

By means of this possibility of ready variation of the trough the further advantage results that one and the same trough apparatus can be employed for spirals of various diameters. For a smaller spiral the upper part of the trough will be allowed to hang relatively low, whilst for a relatively larger spiral the trough is kept correspondingly flatter corresponding to the small curvature of such a spiral.

The links arranged in series as chains can be of desired construction. Preferably rollers or balls arranged to follow one another in series will be employed; on the other hand there may be chosen as members pins of desired length which in general will depend upon the degree to which the inclination can be maintained suited to the pitch of the spiral. If required, guide surfaces can be arranged between a number of link-chains, by means of which guide surfaces the chains are guided in the inclined position. The rollers, balls or pins can be arranged in series upon cords, chains, bands or the like; any other desired means which have a sufficient flexibility may be employed for arranging them in series. For reducing the surface of contact with the spiral tube the links may be grooved or channelled. Moreover, in order to obtain a better grip the members may be provided with a covering, for example of cloth or the like, so that relative motion between the superposed spiral and the trough surface is avoided. The spiral then rotates with the same velocity as that with which the trough surface moves.

The driving members for moving the trough surface are moved with the same number of rotations and each member is indirectly driven so that the trough when adjusted remains so. Preferably the driving members are formed as shafts, in which longitudinal grooves are provided, into which the links fit. Hence the shafts with their longitudinal grooves work like sprocket wheels, which advance the chain by means of the teeth projecting between the grooves. The size of the links of the chain, that is the rollers, balls or pins, depends upon the size of the grooves or vice versa. The movement of the rollers can be effected by a common drive.

Shafts may also be employed as driving members however, in which radially running bores are provided. In this case the links, for example the balls, of the chains forming the trough fit into these bores. Preferably the bores are of a conical shape, that is to say the diameter becomes smaller towards the centre of the shaft, which has the advantage that the balls are in every case surely gripped even if they are of various sizes. Preferably individual raised portions are arranged between the bores of the shafts, preferably in the form of conical pins, for guiding the link chains.

Instead of employing link chains the trough surface can also be formed in that rollers or rods running longitudinally of the trough are so arranged that they form a trough surface, while the rods or rollers rotate about their longitudinal axes. By means of the rotation of these rods an impulse is imparted to the superposed spiral for its advancement. Hereby rigidly arranged striking surfaces are provided projecting into the path of the spiral which may, for example, consist of rollers, by means of which the helical advancement of the spiral is obtained.

The material forming the trough surface, that is the material for the chain links, should be a substance of low conductivity, so that the spiral tubular product can be maintained at a temperature suitable for drying and conveying. Preferably wood will be employed for the links of the trough chains.

The aeration of the continuous spiral takes place on the one hand from below, through the trough surface consisting of link-chains, for which purpose the whole trough apparatus is advantageously inserted in a chest supplying drying gas, on the other hand the spiral is aerated also from the sides and if necessary from above also.

In many cases it is necessary to afford a further support outside the trough surface to the tube emerging from the nozzle, which is conveyed further in spiral form until the spiral tube has attained such a strength that it retains its spiral form without further special assistance. For this purpose there is provided at the beginning of the spiral and inside the latter a tubularly constructed channel supplying the drying gas, the gas escape openings of which are spirally arranged. However any other desired means may be employed, for example bearing rollers which support the spiral at individual places either from inside or outside.

Some embodiments of the invention are illustrated in the accompanying drawings by way of example.

Figs. 1 and 2 show a plan view of a trough arrangement according to the invention, Fig. 3 is a cross-section through a trough apparatus, and Fig. 4 shows diagrammatically the various elements for forming a finished casing, In Figs. 5 and 6 a further embodiment is shown, and in fact Fig. 5 shows a plan view of a trough surface, and Fig. 6 shows a cross-section through a driving roller upon the line V—V of Fig. 5.

In Figs. 7 and 8 a further embodiment of a trough apparatus is shown, and in fact Fig. 7 is a cross-section through the trough, and

Fig. 8 is a plan.

The driving shafts 1 and 2 of the trough apparatus which are each driven by desired driving means have longitudinal grooves 3 upon their periphery. Upon these shafts there are disposed chains which consist of links 4 arranged in series upon a cord 5 or the like, which links are so large that they fit into the grooves 3 of the shafts. The link-chains lie at a certain angle to the longitudinal axis of the shaft which corresponds to the pitch of the spiral. Guiding plates 6 which are so constructed that they cannot come within the range of the superposed tubular spiral 10 serve for maintaining the inclined position of the link chains.

The upper part of the link chain hanging over the shafts forms a trough in which the tubular spiral 10 is laid. By means of the uniform motion of the shafts 1 and 2 the link-chain is moved in one direction whilst maintaining the trough formed. The tubular spiral lying with its lower part in the trough is carried along correspondingly by means of this continuous motion of the trough surface so that the tubular spiral 10 rotates continuously. By virtue of the spherical shape of the individual massive links 4, it is attained that as small as possible a surface of contact is present between the trough surface and the superposed tubular spiral part, which surface of contact suffices however to give the necessary impulse for rotation to the tubular spiral 10, whereby relative motion between the superposed tubular spiral and the trough surface is prevented.

The whole trough apparatus is preferably surrounded by a chest or other bounding walls 7, in such a way that the dry gas is so introduced that the trough surface and hence the tubular spiral is aerated from below. A current of gas which may pass around the helically wound casing 10 is introduced into the drying chamber 7 by pipe 23. Roller 1 may be driven, for example, directly by a motor 19. In this case, a sprocket wheel 20 is arranged on the shaft. A chain 21 leads from the sprocket wheel 20 to a sprocket wheel 22 which drives roller 2 with equal speed.

Fig. 2 shows another construction of the link-chain. In this case the individual links which are arranged in series upon a band 8 are formed of pins 9 which likewise fit into the grooves in the shafts. Instead of the band several cords can also be employed upon which the pins are arranged in series.

The arrangement of the links such as balls, rollers or pins or the like in series upon the cords or bands may also be effected in such a way that the links receive a certain individual mobility about their own axes.

By adjustment of the links 4 of the chain in adjacent grooves of the shafts 1 or 2 a more or less deep trough can be obtained, whereby the trough can readily be adapted to the size of diameter of the tubular spiral. It is not in all cases necessary that the tubular spiral 10 shall extend within the trough nearly from one shaft to the other, but on the contrary the trough may also have a flatter curvature than the curvature of the tubular spiral.

In Fig. 4 a tubular spiral 10 is shown lying upon the mould, one part of which spiral is supported in the middle by a tubular member 18 supplying drying gas which member has gas passages 33 in spiral form in the tube.

The tubular casing is expressed from annular nozzle 28 and, at first, a short part is wound helically about the tube 18, which, however, extends only into the initial portion of the trough. The casing then continues to the trough 4, 5, 8, 9, 11, etc. on which the casing is further moved with the same helical winding as on tube 18. The path which the casing follows in the trough is several-fold the length of the tube 18. The tubular casing is constantly subjected to the action of a blast of air, and air is also blown into the tubular casing during the expressing from the annular nozzle. At the end of the feeding or conveying device, the tubular casing is passed between two rubber rollers 30 which are driven by a motor 31. The rollers 30 compress, i. e. squeeze together, the tubular casing so that the air blown thereinto during the helical winding cannot escape. At 32, finally, there is shown a flattened sausage casing.

There are several factors which are determinative of the fact that the winding does not collapse while in the trough. On the one hand, this is due to the fact that it is constantly subjected to a blast of air laterally of the annular nozzle. Of course, the other end is compressed by the rubber rolls and this prevents the escape of air. On the other hand, the wound member moves in the helical winding so that even if the movement is relatively slow there is always a certain torsion which contributes to the maintenance of the wound member in uncollapsed form. Experience has shown that the wound member retains this form over a very long extent.

The tube 18 may be provided with openings corresponding to the helical winding of the tubular casing, through which for instance, air may be blown against the casing with the aid of a blower 29.

The guide plates 6 are disks which serve to maintain the chain members 8 on rollers 2 in the correct position. They engage around rollers 2 and are securely mounted on the frame.

In the embodiment of Figs. 5 and 6 the shafts 12 and 13 driving the link-chains 11 are provided with radially disposed bores 14 which narrow towards the centre of the shaft. The balls 11a of the link-chains fit into these bores, whereby they sink more or less deeply into the bores according to their size. The conical shape of these bores has therefore the advantage that one is not tied down to a certain size of balls for the chain, but that if required chains with links of various sizes can be chosen for the same driving shafts. In order that the chains shall be guided properly upon the shafts 12 and 13, raised portions 15 are preferably provided between the bores 14, which raised portions may advantageously be constructed in the form of projecting pyramidal pins. The shafts 12 and 13 thereby act somewhat like chain wheels. The link-chains in this embodiment of the shafts run in the desired inclined position only along the free stretch between the shafts. Upon the shafts themselves the chains lie perpendicular to the longitudinal axes of the shafts. It has been shown that such an arrangement gives an unobjectionable drive. The advantage of this arrangement consists essentially in that no guiding plates are necessary for maintaining the inclined position of the link-chains and that a different inclination can readily be adjusted in that the chains are hung in series of holes upon one shaft which lie at a more or less large lateral displacement from the corresponding series of holes in the other shaft.

In the construction shown in Figure 5 the same drive as previously described with reference to the modification shown in Figure 1 is used.

Figs. 7 and 8 show a construction of the trough surface in which no link-chains are employed, but in which on the contrary the trough surface is constructed in that rods or shafts 16 running longitudinally of the trough are provided, which rotate at any time about their longitudinal axes. In order that the superposed spiral shall be able to advance helically, striking surfaces 17 are arranged which are stationary and are disposed along the length of the trough to correspond with the helical course of the spiral. Preferably these striking surfaces are formed as rollers. They serve not to support the spiral but only for constraining the spiral to carry out a helical advancing motion.

The drive for the modification shown in Figure 7 is constructed as follows: A gear-wheel 24 is keyed on each of the shafts 16. Gear-wheels 25 which mesh with the gear-wheels 24, are provided in order to cause the shafts 16 to rotate in the same direction. A gear-wheel 27 engaging with one or several gear-wheels 25, is driven by a motor 26.

What I claim is:

1. A method of conveying helical structures such as sausage casings comprising forming a helical casing, inflating said casing, advancing said casing along a trough which has a curvature substantially corresponding to that of said helical casing and imparting to said casing while in said trough impulses substantially parallel to the helical inclination of said casing and in the direction of the helical advance of said casing.

2. A method of drying and conveying helical structures such as sausage casings comprising forming a helical casing, inflating said casing with a gas, advancing said casing along a trough which has a curvature substantially corresponding to that of said helical casing, imparting to said casing while in said trough impulses substantially parallel to the helical inclination of said casing and in the direction of the helical advance of said casing and subjecting said casing while on said trough to a drying medium.

3. A device for drying and conveying helical structures such as inflated helical sausage casings comprising spaced supporting rollers, endless substantially parallel relatively close link chains supported on and extending between said rollers, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and chains to advance the helical structure through the trough in a direction parallel to the axes of the rollers and means for supply a drying gas about said chains and a structure disposed within said trough support.

4. A device for drying and conveying helical structures such as inflated helical sausage casings comprising spaced supporting rollers, endless substantially parallel relatively close link chains supported on and extending between said rollers, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle and means for driving said rollers and chains to advance the helical structure through the trough in a direction parallel to the axes of the rollers.

5. A device for drying and conveying helical structures such as inflated helical sausage casings comprising spaced supporting means, substantially parallel relatively close link means having a greater length than the distance between said supporting means disposed on and extending between said supporting means so as to form a trough support for a structure being treated, the plane of each link means intersecting the axis of each supporting means at an acute angle, means for moving said link means to advance the helical structure through the trough in a direction parallel to the axes of said supporting means and means for supplying a drying gas about said link means.

6. A device for drying and conveying helical structures such as inflated helical sausage casings comprising spaced supporting means, substantially parallel relatively close link means having a greater length than the distance between said supporting means disposed on and extending between said supporting means, the plane of each link means intersecting the axis of each supporting means at an acute angle, said link means forming a trough shaped support having a curvature substantially corresponding to the curvature of a helical structure being treated, means for varying the curvature of such trough shaped support, means for supplying a drying gas to said trough shaped support and a structure being treated disposed thereon and means for moving said link means to advance the helical structure through the trough support in a direction parallel to the axes of the supporting means.

7. A device for drying and conveying helical structures such as helical inflated sausage casings comprising spaced supporting rollers, endless substantially parallel relatively close link chains supported on and extending between said rollers, each of said chains comprising an endless cord and links strung on said cord in predetermined relationship, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and chains to advance the helical structure through the trough in a direction parallel to the axes of the rollers and means for supplying a drying gas about said chains and a structure disposed in said trough support.

8. A device for drying and conveying helical structures such as inflated helical sausage casings comprising spaced supporting rollers, endless substantially parallel relatively close link chains supported on and extending between said rollers, said rollers having longitudinal grooves therein for receiving the links of said chains in order to drive said chains, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and chains to advance the helical structure through the trough in a direction parallel to the axes of the rollers and means for supplying a drying gas about said chains and a structure being treated disposed in said trough support.

9. A device for conveying helical structures such as inflated helical sausage casings comprising spaced supporting rollers, endless substantially parallel relatively close link chains supported on and extending between said rollers, each of said chains comprising an endless cord and links strung on said cord in predetermined relationship, said rollers having spaced recesses therein for receiving said links, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle and means for driving said rollers and chains to advance the helical structure through the trough in a direction parallel to the axes of the rollers.

10. A device for drying and conveying helical structures such as inflated helical sausage casings comprising means for inflating a structure, means for giving such structure a helical form, spaced supporting means, substantially parallel relatively close link means having a greater length than the distance between said supporting means disposed on and extending between said supporting means, the plane of each link means intersecting the axis of each supporting means at an acute angle, means for feeding said inflated structure onto said link means and means for moving said link means to advance the helical structure through the trough in a direction parallel to the axes of said supporting means.

11. A device for drying and conveying helical structures such as inflated helical sausage casings comprising, means for giving such structure a helical form, spaced supporting means, substantially parallel relatively close link means having a greater length than the distance between said supporting means disposed on and extending between said supporting means, the plane of each link means intersecting the axis of each supporting means at an acute angle, said link means forming a trough shaped support having a curvature substantially corresponding to the curvature of such helical structure, means for varying the curvature of said trough shaped support, means for feeding said inflated structure onto said trough support, means for supplying a drying gas to said trough shaped support and a structure being treated disposed thereon and means for moving said link means to advance the helical structure through the trough in a direction parallel to the axes of said supporting means.

12. A device for drying and conveying helical structures such as inflated helical sausage casings comprising, means for inflating a structure, means for giving such structure a helical form, spaced supporting rollers, endless substantially parallel relatively close link chains supported on and extending between said rollers, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and said chains to advance the helical structure through the trough in a direction parallel to the axes of the rollers, means for feeding said inflated structure onto said trough support, and means for supplying a drying gas about said chains and a structure disposed within said trough support.

13. A device for drying and conveying helical structures such as helical inflated sausage casings comprising, means for inflating a structure, means for giving such structure a helical form, spaced supporting rollers, endless substantially parallel relatively close link chains supported on and extending between said rollers, each of said chains comprising an endless cord and links strung on said cord in predetermined relationship, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and chains to advance the helical structure through the trough in a direction parallel to the axes of the rollers, means for feeding said inflated structure onto said trough support, and means for supplying a drying gas about said chains and a structure disposed in said trough support.

14. A device for drying and conveying helical structures such as inflated helical sausage casings comprising, means for inflating a structure, means for giving such structure a helical form, spaced supporting rollers, endless substantially parallel relatively close link chains supported on and extending between said rollers, said rollers having longitudinal grooves therein for receiving the links of said chains in order to drive said chains, said chains having a length more than twice the distance between said supporting rollers so as to form a trough support for a structure being treated and permit variations in the depth of said trough support to accommodate different sizes of helical structures, the plane of each chain intersecting the axis of each roller at an acute angle, means for driving said rollers and chains to advance the helical structure through the trough in a direction parallel to the axes of the rollers, means for feeding said inflated structure onto said trough support, and means for supplying a drying gas about said chains and a structure being treated disposed in said trough support.

15. A device for conveying helical structures such as inflated helical sausage casings comprising, means for inflating a structure, means for giving such structure a helical form, spaced supporting rollers, endless substantially parallel relatively close link chains supported on and extending between said rollers, each of said chains comprising an endless cord and links strung on said cord in predetermined relationship, said rollers having spaced recesses therein for receiving said links said chains having a length more than twice the distance between said supporting rollers so as to form a trough support for a structure being treated and permit variations in the depth of said trough support to accommodate different sizes of helical structures, means for feeding said inflated structure onto said trough support, the plane of each chain intersecting the axis of each roller at an acute angle and means for driving said rollers and chains to advance the helical structure through the trough in a direction parallel to the axes of the rollers.

OSKAR WALTER BECKER.